United States Patent

Bonnaud

[11] 4,084,765
[45] Apr. 18, 1978

[54] WINDING DEVICE, IN PARTICULAR FOR A VEHICLE SAFETY BELT

[75] Inventor: Michel Bonnaud, Montbeliard, France

[73] Assignees: Automobiles Peugeot, Paris; Regie Nationale des Usines Renault, Boulogne-Billancourt, both of France

[21] Appl. No.: 643,770

[22] Filed: Dec. 23, 1975

[30] Foreign Application Priority Data

Dec. 24, 1974 France .................. 74 42706

[51] Int. Cl.² ............... B65H 75/48; A62B 35/02
[52] U.S. Cl. .................. 242/107.4 B; 242/107
[58] Field of Search ......... 242/107, 107.4 R, 107.4 A, 242/107.4 B, 107.4 C, 107.4 D, 107.4 E; 280/744–747; 185/37, 39; 267/156; 297/388

[56] References Cited

U.S. PATENT DOCUMENTS

| 924,669 | 6/1909 | Johnson | 185/37 |
|---|---|---|---|
| 2,845,234 | 7/1958 | Cushman et al. | 242/107.4 B |
| 3,480,228 | 11/1969 | Ulert | 242/107.4 B |
| 3,905,562 | 9/1975 | Kell | 242/107.4 B |
| 3,907,227 | 9/1975 | Takada | 242/107.4 B |
| 3,997,126 | 12/1976 | Karlsson | 242/107.4 R X |

*Primary Examiner*—Harvey C. Hornsby
*Assistant Examiner*—John M. Jillions
*Attorney, Agent, or Firm*—Burns, Doane, Swecker & Mathis

[57] ABSTRACT

The device comprises a drum around which a belt is wound under the action of a return spring. This spring acts through a cable passing around two pulleys of variable diameter which produce a return force which is independent of the extent of the winding of the belt. Moreover, the cable passes around a pulley which permits transmitting to a device responsive to acceleration a value which represents the linear acceleration of the belt which is also independent of the extent of the winding of the belt.

2 Claims, 6 Drawing Figures

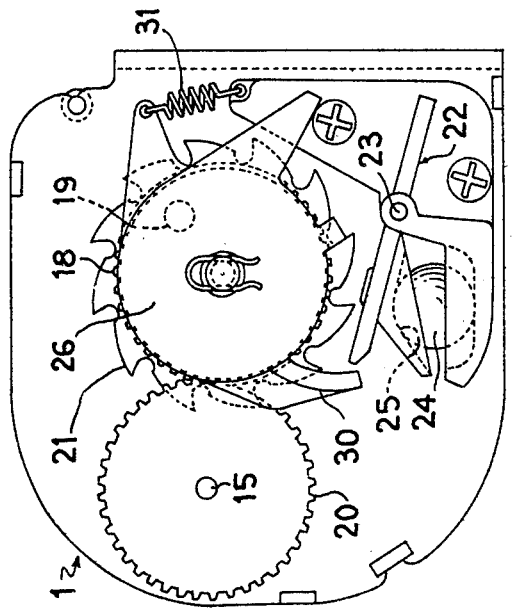
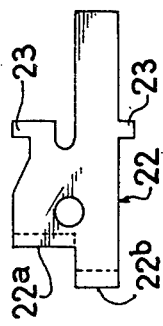
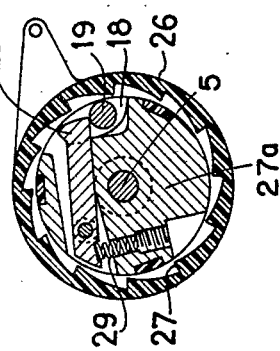
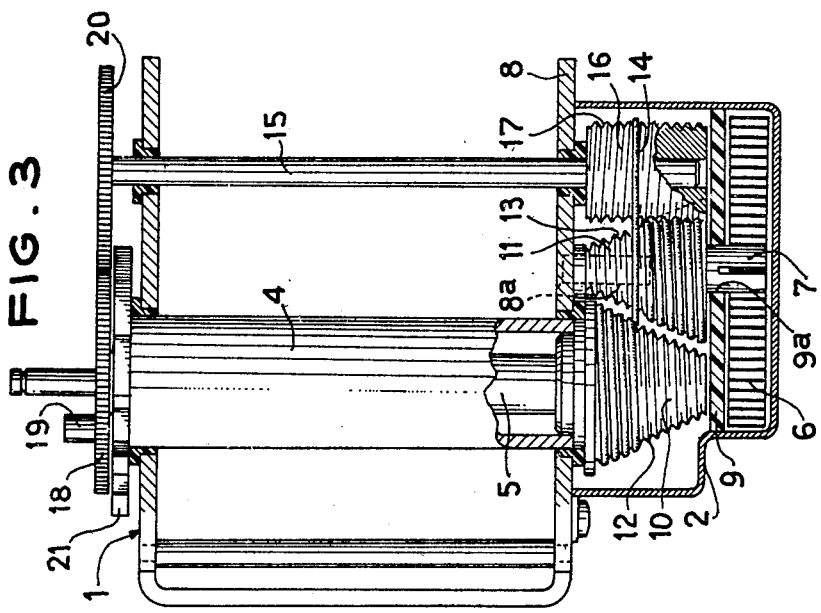

WINDING DEVICE, IN PARTICULAR FOR A VEHICLE SAFETY BELT

The present invention relates to winding devices for safety belts employed for example in automobile vehicles.

There are often employed in automobile vehicles safety belts whose end is fixed to a drum mounted to rotate in a housing, at least one elastically yieldable return means for returning the drum being provided which acts in the direction for winding the belt.

This elementary device has the following drawback: the return force exerted by the yieldable return means depends on the extent of the winding of the belt, this return force being great when the belt is unwound to a large extent and becoming small when, on the contrary, the belt is hardly unwound. The return force may even become so small that the user must intervene to ensure that the belt is fully wound.

It is also known to associate with this rotary drum a mechanism whereby it is possible to block it against rotation, this mechanism being controlled by a device which detects either the deceleration of the vehicle or the acceleration of the movement of rotation of the drum under the effect of a pull exerted on the belt. Whereas the detection of the deceleration of the vehicle does not present any particular problem, on the other hand the fact of detecting the acceleration of the movement of rotation of the drum presents a serious drawback since the value detected does not represent the linear speed of unwinding of the belt but is a function of the extent of the unwinding of the belt which may differ, depending on the corpulence of the user or on the longitudinal position of the seat occupied by the user. Now, it is the linear acceleration of the belt which in fact represents the magnitude of the movement of the user in the forward direction upon a sudden braking or a shock.

An object of the present invention is to provide means for controlling the blocking mechanism of the winder which acts as a function of the linear speed of the unwinding of the belt and not as a function of the speed of rotation of the drum from which the belt is unwound.

According to the invention there is provided a winding device for a safety belt, in particular for an automobile vehicle, of the type comprising a fixed housing, a drum which is rotatably mounted in the housing and on which drum there is fixed one end of the belt, and at least one elastically yieldable return means exerting on the drum a torque which tends to wind the belt onto the drum, the elastically yieldable means being disposed between the housing and a shaft which is mounted to rotate about an axis parallel to the axis of the drum, the drum and the shaft being each integral with a corresponding pulley which has a diameter which increases from one end to the other of the pulley and has a helical groove, the two pulleys being oriented in opposite directions, a transmission cable being fixed by each one of its ends to each of the pulleys.

According to the invention, the winding device is completed by means responsive to the linear acceleration of the belt when the latter unwinds, the responsive means acting on a mechanism for blocking the drum against rotation.

According to a preferred embodiment, the responsive means comprise a cylindrical pulley having an axis parallel to the axis of the drum, and around which pulley the aforementioned cable passes in its path of travel between the two variable-diameter pulleys, the cylindrical pulley being integral with a shaft which constitutes the input element of device which is responsive to angular acceleration beyond a threshold value and may be of known construction.

According to a preferred embodiment, the two variable-diameter pulleys have a curved shape. Moreover, they preferably have a screwthread having a variable pitch, this pitch being greater at the end of the pulleys of largest diameter.

The invention will now be described in more detail with reference to the accompanying drawings given merely by way of example and in which:

FIG. 3 is a sectional view taken on line 3—3 of FIG. 2;

FIG. 4 is an elevational view of the right side of the device shown in FIG. 1, a part of the housing having been removed;

FIG. 5 is a sectional view taken on line 5—5 of FIG. 1, and

FIG. 6 is a view of a component part of the device.

Figure 2:
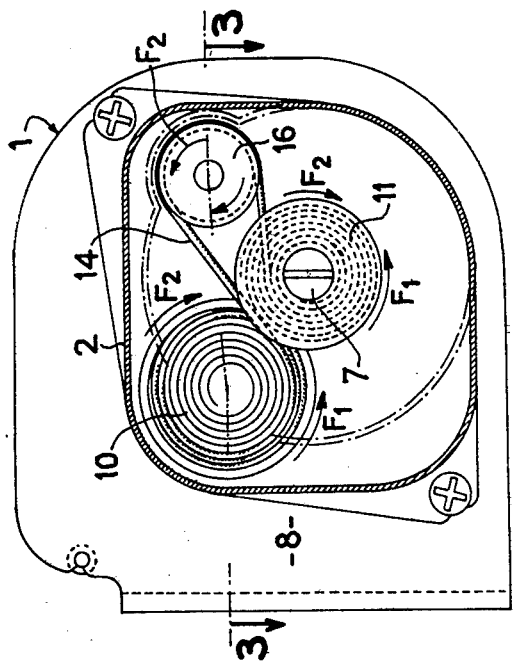
FIG. 2 is an elevational view of the left side of the device shown in FIG. 1.

As can be seen in the drawings, the winding device for the safety belt, adapted in particular to be employed in an automobile vehicle, comprises a fixed main housing 1 which is completed by two lateral housings 2 and 3. In the main housing, there is rotatably mounted a drum 4 integral with a shaft 5 which extends into the two lateral housing 2 and 3. Fixed to the drum in any known way is one end of the belt (not shown).

Figure 1:
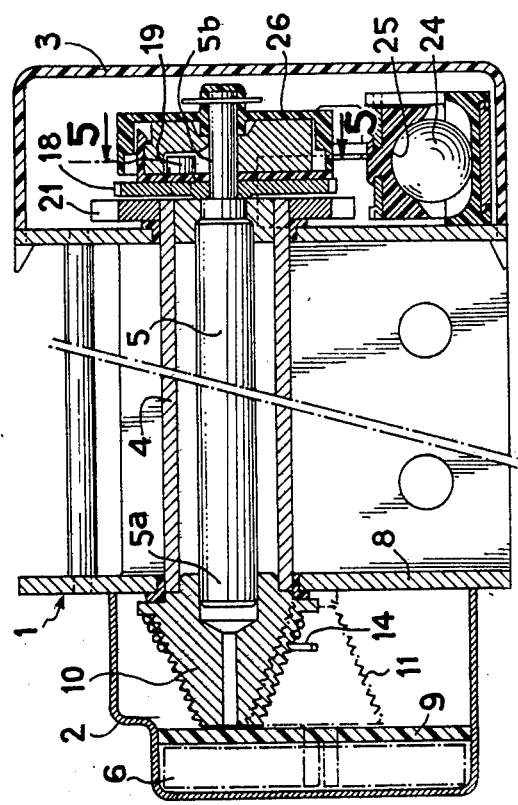
FIG. 1 is a longitudinal sectional view of a winding device according to the invention.

In the housing 2 shown on the left of FIG. 1 there are disposed an elastically yieldable return means 6 and means for ensuring that the return force exerted on the belt by the elastically yieldable return means is substantially constant. For this purpose, there is provided a shaft 7 which is rotatably mounted in a member 8a integral with a side wall 8 of the housing 1 and in a bearing 9a of a parellel side wall 9. One end of a return spring 6 is fixed to this shaft. Disposed on the shaft 7 and on the extension 5a of the shaft 5 are two pulleys 10, 11 of variable diameter, which are conical in the illustrated embodiment. The pulley 10 is rendered integral with the shaft 5a and the drum 4 and the pulley 11 is in fact in one piece with the shaft 7. The pulleys 7, 10 have helical grooves 12, 13 of the same pitch and the same direction of helix. On the whole, the two pulleys therefore have identical operative parts, the part of the largest diameter of the pulley 10 being disposed in the vicinity of the side wall 8 of the housing, whereas the other pulley 11 is oriented in the opposite direction and therefore has its smallest diameter in the vicinity of the same side wall.

There is also provided a shaft 15 which extends in the left lateral housing 2 and carries a cylindrical pulley 16 having a helical groove 17 whose pitch has the same value as the pitches of the grooves 12 and 13 but whose helix is in the opposite direction. This pulley constitutes a counterpulley around which the cable 14 extends in its path between the two-variable-diameter pulleys 10 and 11 (FIG. 3).

There will now be described the part of the device which is housed in the lateral housing 3 on the right of FIG. 1. Projecting into the housing 3 are the ends of the shafts 5 and 15 and on a portion 5b of reduced diameter of the shaft 5 there is rotatably mounted a gear wheel 18 carrying a block 19 which extends from its lateral wall. This gear wheel meshes with a gear wheel 20 which is connected to rotate with the shaft 15.

The drum blocking device comprises a toothed disc 21 integral with the drum. This disc may be blocked against rotation by an operative portion 22a of a lever 22 which is mounted to pivot about portions 23 constituting a pivot (FIGS. 4 and 6).

The means for actuating this blocking mechanism comprises a first device responsive to the deceleration of the vehicle and, furthermore, a second device responsive to the acceleration of the rotation of the gearwheel 18 beyond a threshold value. The first of these devices comprises a ball 24 acting on a ramp 25 so as to swing the lever 22 and bring it to an operative position. The second device or mechanism is of known type and comprises a case 26 rotatably mounted on the shaft 5 and including an internal notching 27. Pivotably mounted on a member 27a in this case 26 is a lever 28 which is biased by a spring 29 to its withdrawn position and in contact with the block 19. The case 26 is integral with a tab 30. When the lever 28 pivots relative to the member 27a, owing to the inertia of the latter and owing to a sufficiently high acceleration of the block 19 carried by the gear wheel 18, and is engaged in the internal notches of the case 26, the tab 30 acts under the portion 22b of the lever 22. The latter then pivots and engages by its operative portion with the teeth of the disc 21. The case 26 is returned by a spring 31. On the other hand, if the acceleration of the block 19 is below a threshold value, the spring 29 is not compressed by the lever 28 and the latter merely rotates about the shaft 5 with the member 27a which carries the lever 28 and the drum 4 is not blocked. This corresponds to a rotation of the drum which occurs when there is no sudden pull on the belt such as when the user moves in a normal way in his seat.

This device controlling the blocking means may be constructed in a different manner without departing from the scope of the invention.

The design and arrangement of the pulleys 10 and 11 may also be modified. In particular, in one preferred embodiment, the pulleys have a screwthread having a variable pitch, this pitch being greater adjacent the large diameter of the pulleys. By means of this additional feature, the loop formed by the cable remains in a plane perpendicular to the axes of the pulleys. Moreover, in order to maintain the variation in the radius of winding constant for each rotation of the pulley, it is advantageous to give the pulleys a curved shape.

The device described hereinbefore operates in the following manner:

When the belt is returned under the effect of the spring 6, the pulley 11 is driven in rotation in the direction of arrow $F_1$ (FIG. 2) and the cable 14 is wound round this pulley and unwound from the pulley 10 and drives the latter and the drum 4 also in the direction of arrow $F_1$ through the pulley 16. The return torque of the spring 6 diminishes at the same time as the radius of winding of the cable 14 on the pulley 11 so that the tension in the cable 14 remains roughly constant.

Simultaneously, the radius of the unwinding of the cable 14 from the pulley 10 increases at the same time as the radius of the winding of the belt on the drum 4 so that the tension on the belt remains substantially constant and the linear speed of the cable 14 remains proportional to the linear speed of the belt.

The presence of two pulleys 10 and 11 of generally conical shape permits obtaining a return force which is roughly constant whether the belt is unwound to a great extent or is entirely wound on its drum. The pulleys have indeed for function to compensate for the extent of the winding of the belt on its drum.

When the belt is driven under the effect of a force and rotates the drum 4 and the shaft 5 in the direction of arrow $F_2$ (FIG. 2), the transmission ensured by the pulleys 10, 11, 16 and the cable 14 drives the gearwheels 18 and 20 in a manner corresponding to the linear acceleration of the belt. The detection or response of the device 26, 31 therefore depends on this linear acceleration and produces as soon as necessary the blocking of the drum by the lever 22. The unwinding of the belt is then prevented and the user is retained on his seat.

The object of the invention is therefore attained and it will be observed that the means employed for obtaining this result are particularly simple and consequently reliable and relatively cheap.

Having now described my invention what I claim as new and desire to secure by Letters Patent is:

1. In a device for winding a safety belt, in particular for an automobile vehicle, comprising a fixed housing, a drum which is mounted in the housing to rotate about an axis and to which drum one end of the belt is fixed, at least one elastically yieldable return means for biasing said drum in a belt retraction direction, a shaft mounted to rotate about an axis parallel to the axis of the drum, the return means being disposed between the housing and the shaft, a first pulley integral with the drum, a second pulley integral with the shaft, each pulley having a diameter increasing from one end of the pulley to the other end of the pulley and defining a helical groove, the two pulleys being oriented in opposite directions, and a transmission cable fixed at each of its ends to each one of the pulleys, the elastically yieldable return means being drivingly connected to said shaft; the improvement comprising in combination a means for blocking the drum against rotation, a rotatable cylindrical pulley having an axis parallel to the axis of the drum and around which cylindrical pulley the cable passes in its path between the two pulleys, an input shaft integral with said cylindrical pulley and means responsive to acceleration of said input shaft beyond a threshold value of acceleration for actuating said blocking means whereby said input shaft acceleration is directly proportional to the linear acceleration of the belt.

2. A device as claimed in claim 1, wherein said actuating means comprises a first gear wheel integral with said input shaft, a second gear wheel integral with said drum, and in meshing engagement with said first gear wheel, and an output member responsive to rotation of said second gear wheel beyond said threshold acceleration for actuating said blocking means.

* * * * *